United States Patent
Aoki et al.

(10) Patent No.: US 7,647,780 B2
(45) Date of Patent: Jan. 19, 2010

(54) AUTOMOTIVE SEAT AIR-CONDITIONING SYSTEM

(75) Inventors: Shinji Aoki, Chiryu (JP); Keizou Nimura, Nagoya (JP)

(73) Assignee: Denso Corporation, Kariya (JP)

( * ) Notice: Subject to any disclaimer, the term of this patent is extended or adjusted under 35 U.S.C. 154(b) by 81 days.

(21) Appl. No.: 11/589,395

(22) Filed: Oct. 30, 2006

(65) Prior Publication Data

US 2007/0101729 A1 May 10, 2007

(30) Foreign Application Priority Data

Nov. 4, 2005 (JP) .............................. 2005-321300

(51) Int. Cl.
*F25B 21/02* (2006.01)

(52) U.S. Cl. ......................................... 62/3.61; 62/239
(58) Field of Classification Search ................. 62/3.61, 62/3.3, 3.2, 239, 244, 261
See application file for complete search history.

(56) References Cited

U.S. PATENT DOCUMENTS

| | | | | |
|---|---|---|---|---|
| 3,136,577 A | * | 6/1964 | Richard | .................. 297/180.11 |
| 5,117,638 A | * | 6/1992 | Feher | ............................ 62/3.2 |
| 5,524,439 A | | 6/1996 | Gallup et al. | |
| 5,626,021 A | | 5/1997 | Karunasiri et al. | |
| 5,934,748 A | * | 8/1999 | Faust et al. | ............. 297/180.12 |
| RE38,128 E | | 6/2003 | Gallup et al. | |

FOREIGN PATENT DOCUMENTS

JP          10-504977           5/1998

* cited by examiner

*Primary Examiner*—Melvin Jones
(74) *Attorney, Agent, or Firm*—Harness, Dickey & Pierce, PLC (57) ABSTRACT

An automotive seat air-conditioning system includes a vehicle seat 1 having a seat portion 1b used by an occupant and a seatback 1a against which the occupant rests his/her back, and a blower 22 for sucking in the air-conditioning air 8 flowing in the compartments. Further, the air-conditioning air 8 is sucked in by the blower 22 from the air inlet 6 formed on the surface of the seatback 1a. At the same time, the air-conditioning air 8 is blown out from a surface portion of the vehicle seat 1 other than the air inlet 6.

11 Claims, 6 Drawing Sheets

AUTOMOTIVE SEAT AIR-CONDITIONING SYSTEM

BACKGROUND OF THE INVENTION

1. Field of the Invention

This invention relates to an automotive seat air-conditioning system in which an air flow is formed, by a blowing means, through the seats.

2. Description of the Related Art

The conventional automotive seat air-conditioning system of this type described in Japanese Examined Patent Publication No. 10-504977 (FIG. 2) is known. This conventional automotive seat air-conditioning system which comprises a main exchanger fan for sending the air to the seatback of a seat through the air path in the seat, and in which temperature-controlled air is blown to a seated occupant.

SUMMARY OF THE INVENTION

In the conventional automotive seat air-conditioning system described above, the Peltier module is used as a means for controlling the temperature of the blown air, and therefore a device for controlling the Peltier module is required. In the case where a large capacity is required, on the other hand, a considerable amount of power must be supplied, often imposing a great burden on the power supply capacity of the vehicle. As a result, the equipment configuration of the automotive seat air-conditioning system is complicated, thereby posing the problem of a low energy efficiency for the vehicle as a whole.

This invention has been achieved to obviate this problem, and the object thereof is to provide an automotive seat air-conditioning system highly comfortable for the occupants, using simple equipment and high in energy efficiency.

In order to achieve this object, according to this invention, there is provided an automotive seat air-conditioning system comprising an automotive seat (1, 2) including a seat portion (1b, 2b) used an occupant and a seatback (1a, 2a) against which the back of the occupant leans and a blowing means (22) for sucking in the air-conditioning air (8, 9) flowing in the compartments, wherein the air-conditioning air (8, 9) is sucked in by the blowing means (22) from an air inlet (6, 7) formed on the surface of the seatback (1a, 2a) and the air-conditioning air thus sucked in is blown out from a surface portion of the vehicle seat (1, 2) other than the air inlet (6, 7).

In this aspect of the invention, the air-conditioning air flow toward the seatback can be formed and a comfortable air-conditioning space can be formed around the occupant by introducing highly comfortable air-conditioning air, controlled in temperature, into the seatback. Further, the air-conditioning air sucked in from the surface portion of the vehicle seat other than the air inlet is blown out. Thus, a personal air-conditioning space is formed in which the air-conditioning air circulates for the occupant, thereby further improving the comfort and an automotive seat air-conditioning system using simple equipment and high in energy efficiency is provided.

According to this invention, there is provided an automotive seat air-conditioning system, wherein the air inlet (6, 7) is arranged at the upper part of the seatback (1a, 2a). In this aspect of the invention, the air inlet is formed at the upper part of the seatback on which the pressure of the body of the occupant is imposed comparatively infrequently. Thus, the air path resistance is reduced and the air-conditioning air can be sucked in more positively.

According to this invention, there is provided an automotive seat air-conditioning system, wherein the air-conditioning air (8, 9) sucked in from the air inlet (6, 7) is blown out from the surface of the vehicle seat located lower than the air inlet (6, 7).

In this aspect of the invention, the regulated air-conditioning air is sucked in from the air inlet, and after being moved downward, blown out from the seat surface. Thus, a large air flow of the air-conditioning air circulating vertically around the occupant through the vehicle seat can be formed for an improved air-conditioning environment around the occupant.

According to this invention, there is provided an automotive seat air-conditioning system, wherein the air-conditioning air (6, 7) sucked in from the air inlet (6, 7) is blown out from the surface portion of the vehicle seat (1, 2) other than the air inlet (6, 7) through a heat exchanger (29).

In this aspect of the invention, the air-conditioning air, after being further controlled in temperature by the heat exchanger, is blown out from the surface of the vehicle seat, and therefore the comfort of the occupant is further improved. Especially, the cool-down operation has an immediate effect on the occupant.

According to this invention, there is provided an automotive seat air-conditioning system, wherein the heat exchanger is configured of a Peltier module (29). In this aspect of the invention, the heat exchanger can be reduced in size, and the internal space of the vehicle seat can be effectively utilized. Also, the cooling operation can be performed only by supplying electric power, while at the same time reducing the blowout noise level.

According to this invention, there is provided an automotive seat air-conditioning system in cooling mode, wherein the Peltier module (29) is controlled to be driven on the cooling air supply side. Thus, with the decrease in the target blowout temperature TAO of the automotive climate control system, the output of the Peltier module (29) is increased and so is the blown air amount of the blowing means (22).

In this aspect of the invention, the cooling capacity required of the automotive climate control system is complemented with the output of the Peltier module and the resultant cooling air is blown out. Thus, the feeling on the part of the occupant against the cooling air in cooling mode can be enhanced physically, and the cooling requirement of the occupant can be satisfied with a small cooling capacity.

The reference numerals in the parentheses following the names of each means described above indicate the correspondence with the specific means according to the embodiments described later.

The present invention may be more fully understood from the description of preferred embodiments of the invention, as set forth below, together with the accompanying drawings.

DESCRIPTION OF THE PREFERRED EMBODIMENTS

First Embodiment

Figure 1:
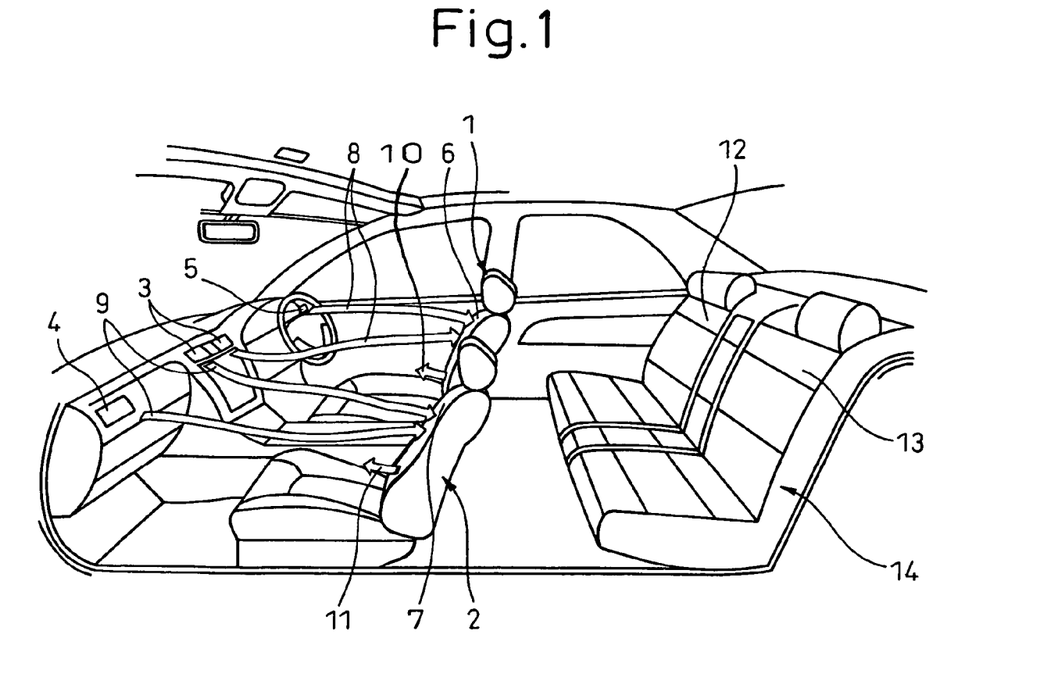
FIG. 1 is a schematic diagram showing the air flow for sucking in the air-conditioning air in an automotive seat air-conditioning system according to a first embodiment.
Figure 5:
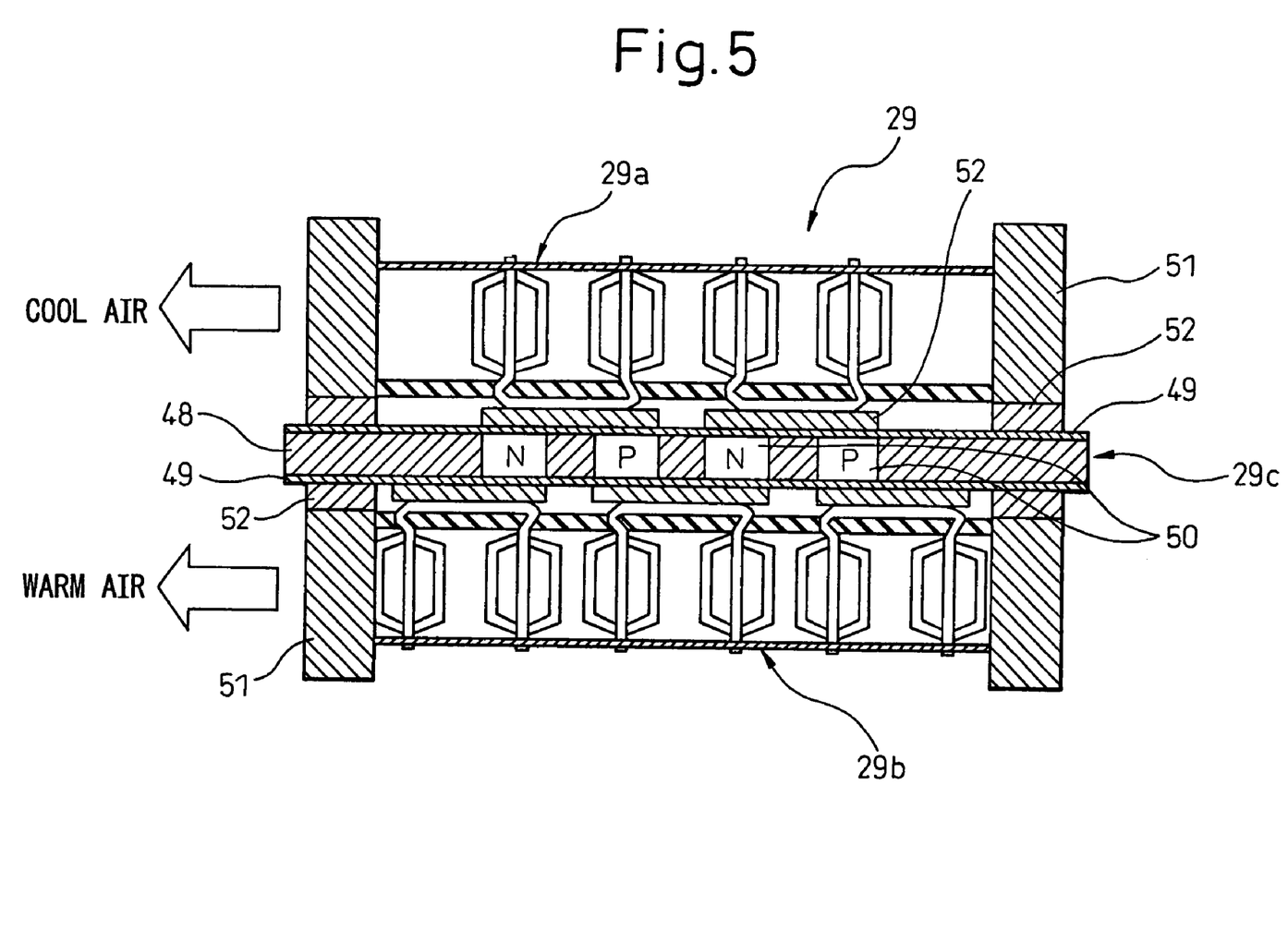
FIG. 5 is a schematic sectional view showing a configuration of the Peltier module included in the automotive seat air-conditioning system according to the first embodiment of the invention.
Figure 6:
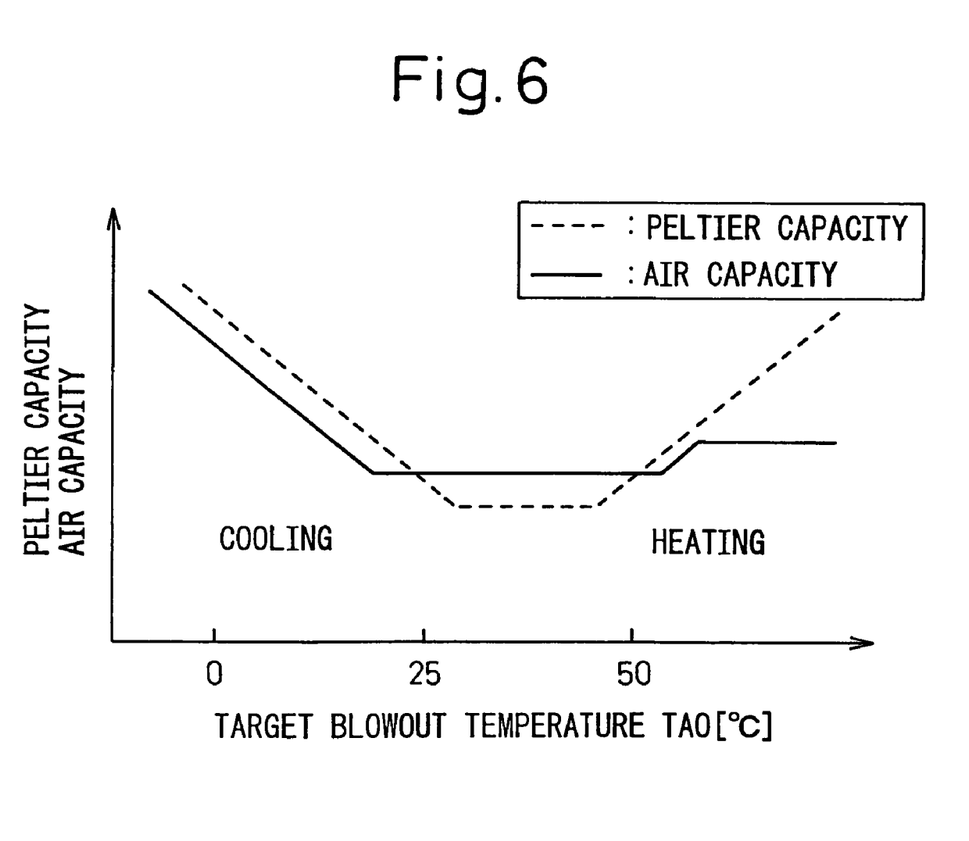
FIG. 6 is a diagram for explaining the operating conditions of the Peltier module for the automotive seat air-conditioning system according to the first embodiment of the invention and the automotive climate control system operatively interlocked with each other.

A first embodiment of the invention is explained below with reference to FIGS. 1 to 6. FIG. 1 is a schematic diagram showing the air flow for sucking in the air-conditioning air using an automotive seat air-conditioning system according to this embodiment. FIG. 6 is a diagram for explaining the operating conditions of the Peltier module of the automotive seat air-conditioning system and the automotive climate control system operatively interlocked with each other.

As shown in FIG. 1, the automotive seat air-conditioning system according to this embodiment comprises an automotive seat 1 including a seat portion 1b used an occupant and a seatback 1a against which the back of the occupant to leans and a blower 22 constituting a blowing means for sucking in the air-conditioning air 8 flowing in the compartments, wherein the air-conditioning air 8 is sucked in by the blower 22 from an air inlet 6 formed on the surface of the seatback 1a, and the air-conditioning air 8 thus sucked in is blown out from the surface portion of the vehicle seat 1 other than the air inlet 6.

This automotive seat air-conditioning system can form a flow of the air-conditioning air 8, 9 circulating between the air-conditioning air outlets 3, 4, 5 of the automotive climate control system (not shown) normally arranged in the instrument panel of the vehicle and the driver's seat 1 or the front passenger seat 2. In other words, the air-conditioning air 8, 9 regulated to a comfortable air environment forms an air flow reaching the vehicle seats from the instrument panel in the front part of the vehicle. Thus, the air-conditioning air 8, 9 is introduced positively toward the backs of the occupants in the vehicle seats 1, 2. In this way, the air environment around the occupants is improved and the immediate effect of the air-conditioning operation is produced.

The air-conditioning air 8 blown out from the air-conditioning air outlets 5, 3 arranged in the instrument panel or the like in front of the driver's seat is sucked in by the blowing means into the vehicle seat-1 from the air inlet 6 formed on the seatback 1a of the driver seat 1. The air-conditioning air 8 is blown out as a circulating air 10 from the surface of the portion of the vehicle seat 1 other than the air inlet 6 through the blowing means.

In similar fashion, the air-conditioning air 9 blown out from the air-conditioning air outlets 3, 4 formed on the instrument panel or the like in front of the front passenger seat is sucked into the vehicle seat 2 from the air inlet 7 formed on the seatback 2a of the front passenger seat 2 by the blowing means. The air-conditioning air 9 is then blown out as a circulating air 11 from the surface portion of the vehicle seat 2 other than the air inlet 7 through the blowing means. The automotive seat air-conditioning system may alternatively be arranged with the rear vehicle seat 14. In this case; the air-conditioning air 3, 4, 5 and the air-conditioning air blown out toward the rear seat occupants from the air-conditioning air outlet formed on the rear side are sucked into the air inlet formed on the seatbacks 12, 13 and blown out as a circulating air from the surface portion of the vehicle seat 14 other than the particular air inlet.

Figure 2:
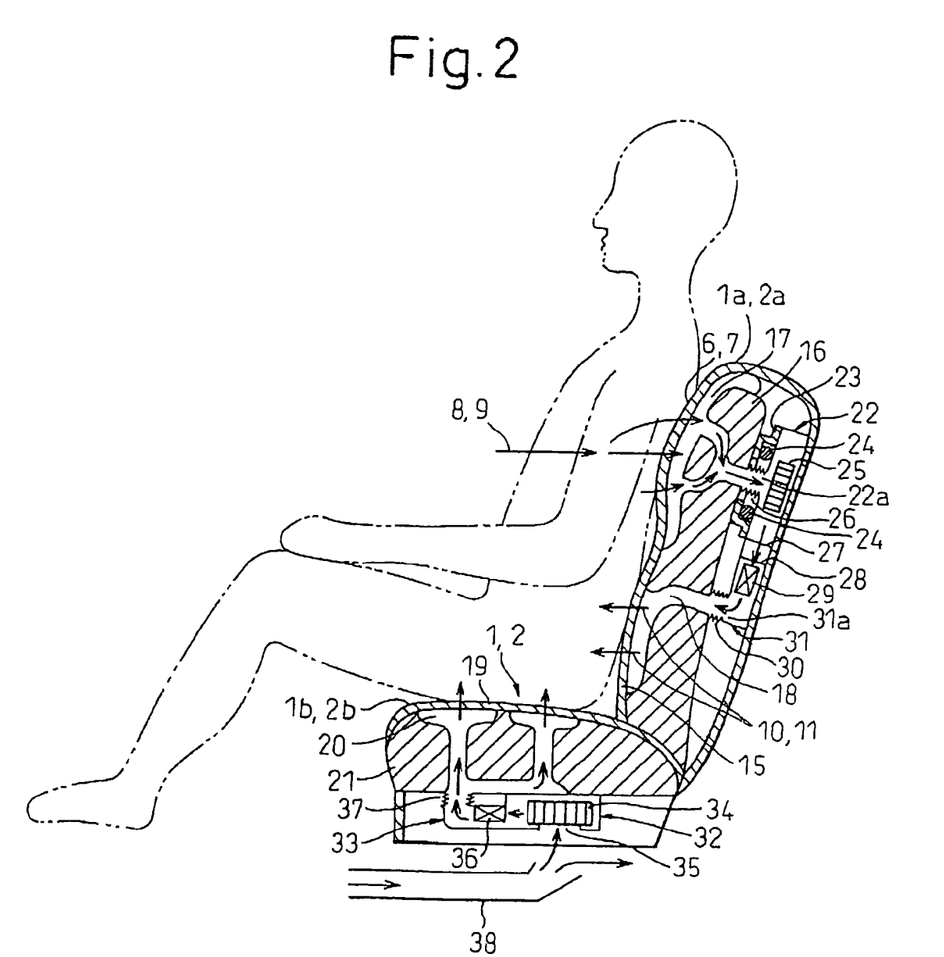
FIG. 2 is a schematic sectional view showing a configuration of the automotive seat air-conditioning system according to the first embodiment of the invention.

Now, the configuration of the automotive seat air-conditioning system is explained with reference to FIGS. 2 to 5. FIG. 2 is a schematic sectional view showing a configuration of the automotive seat air-conditioning system according to this embodiment.

The vehicle seats 1, 2 each include a seat portion 1b, 2b for supporting the hips and the thighs of the occupant and a seatback 1a, 2a for supporting the back of the occupant. The seatback 1a, 2a has a blower 22 constituting a blowing means. The seatback 1a, 2a includes a main pad 16 formed of urethane resin, a cover pad 15 for covering the main pad 16, seat spring members 24, 24a located on the back of the main pad 16 and a frame member (not shown) located inside the cover pad 15, all of which make up a profile with the surface covered by a surface material.

The blower 22 is fixed on the seat spring member 24 through a bracket 23, and an elastic member of rubber is interposed in the joints between the seat spring members 24, the bracket 23 and the blower 22 not to transmit the vibration of the blower 22 to the occupants.

The cover pad 15 located inside the surface material is an air-permeable buffer of urethane resin or the like and has a predetermined thickness. The interior covered by the cover pad 15 has the main pad 16 formed in a predetermined shape, which main pad 16 makes up an air inlet path 17 for establishing communication between the air inlets 6, 7 and the blower 22. The main pad 16 mainly holds the seatback 1a, 1b in shape while at the same time functioning as a buffer to absorb the vibration which otherwise might reach the occupants.

The surface material is formed with a multiplicity of pores, and the space in the compartments and the air inlet path 17 communicate with each other through the surface material and the cover pad 15. Also, the surface material 17 can be formed of an air-permeable fabric with a multiplicity of pores communicating with the air inlet path 17. The multiplicity of the pores formed in the surface material correspond to the air inlet holes making up the air inlets 6, 7.

The air inlets 6, 7 are desirably arranged in the upper part of the seatback 1a, 2a. Especially, the air inlets 6, 7 are arranged on the surface of the vehicle seats 1, 2 corresponding to the neighborhood of the shoulder or the area from the shoulder to the neck or the head of the occupant seated in the seat portion 1b, 2b in a posture with his/her back leaning on the seatback 1a, 2a.

The air inlet path 17 is connected to the air inlet 22a of the blower 22 by a connection tube 26 on the back of the seatback 1a, 2a. The blower 22 has a fan 25 and an air outlet 27 centrifugally of the fan 25. The air outlet 27 communicates, through a connection tube 30, with an outlet air path 18 formed by the main pad 16 of a predetermined shape. The air outlet path 18 communicates with the air outlets formed in the surface material in a similar configuration to the multiplicity of the pores of the air inlets 6, 7.

The air outlets are arranged on the surface portion of the vehicle seats 1, 2 other than the air inlets 6, 7. Specifically, the air outlets can be arranged around or above the air inlets 6, 7 or in positions surrounded by the air inlets 6, 7. Especially, the air outlets are desirably arranged on the surface of the vehicle seats located under the air inlets 6, 7.

The connection tubes 26, 30 can each be formed of a flexible tube of bellows type and are useful for setting the air outlet and the air outlet path 18 or the air inlet 22*a* and the air inlet path 17 in appropriate relative positions.

Also, a heat exchanger unit 31 may be inserted between the air outlet 27 of the blower 22 and the connection tube 30, and a heat exchanger 29 for cooling or heating the air-conditioning air 8, 9 may be arranged in the heat exchanger unit 31. The Peltier module 29 having the configuration shown in FIG. 5 and described later is a useful example of the heat exchanger 29.

The fan 25, if configured as a sirocco fan, is desirably arranged with the axial direction thereof at right angles to the air inlet 22*a*. In this arrangement, the air-conditioning air 8, 9 sucked in axial direction from the air inlet 22*a* is discharged toward the air outlet 27 centrifugally from the rotation center of the fan 25, and through the connection tube 30 and the air outlet path 18, blown out into the compartments from around the back and the hip of the occupant out of the surface of the seatback 1*a*, 2*a*.

In the case where blower 22 is configured in such a manner that the height of the fan 25 is kept low, the system height is reduced and the space on the back of the seatback 1*a*, 2*a* can be effectively utilized. Also, by increasing the fan diameter, the blower 22 can secure the air capacity and becomes resistant to an high pressure loss unique to the sirocco fan. A predetermined air capacity can thus be secured even in the case where the inlet air path 17 and the outlet air path 18 have a small sectional area or a complicated shape.

The blower 22 of the automotive seat air-conditioning system according to this invention may be arranged at a distant position from the vehicle seats 1, 2 instead of inside the vehicle seats 1, 2. In this configuration, the blower 22 is connected to a duct extended for communication with the inlet air path 17 formed in the vehicle seats 1, 2.

A blower 32 making up the blowing means may be arranged on the back of the seat portions 1*b*, 2*b* so that the air-conditioning air blows out from the surface of the seat portions 1*b*, 2*b*. This configuration is explained below. The profile of the seat portion. 1*b*, 2*b* is formed of a main pad 21 of urethane or the like and a cover pad 19 covering the main pad 21, with the surface thereof covered with a surface material.

The cover pad 19 is a buffer of urethane or the like and, while being air permeable, has a predetermined thickness. The main pad 21 is formed in a predetermined shape and makes up an outlet air path 20 to establish communication between the air outlet and the blower 32. The main pad 21 mainly holds the seat portions 1*b*, 2*b* in shape and has the function as a buffer member to absorb the vibration before reaching the occupants.

The surface material is formed with a multiplicity of pores, and the space in the compartments and the air outlet path 20 communicate with each other through the cover material and the cover pad 19. Also, the surface material may be configured of an air-permeable fabric to form a multiplicity of pores communicating with the outlet air path 20. The multiplicity of pores formed on the surface material correspond to the air outlet holes making up the air outlet.

The blower 32 is arranged with the air inlet 35 facing down. The air inlet 35 is open to the position in opposed relation to the opening of a rear foot duct 38 for sending the air-conditioning air toward the feet of the occupants seated in the rear seat regardless of whether the automotive climate control system is in either cooling or heating mode. The air outlet of the blower 32 communicates with the air outlet path 20 through the connection tube 37.

The heat exchanger unit 33 may be arranged between the air outlet of the blower 32 and the connection tube 37, and the heat exchanger 36 for cooling or heating the air-conditioning air that has flowed through the rear foot duct 38 may be arranged in the heat exchanger unit 33. The Peltier module 36 can be used as an example of the heat exchanger 36. The Peltier module 36 has a similar configuration to the Peltier module 29 having the configuration shown in FIG. 5 described later. In the case where the Peltier module 9, 36 is used, a heat exhaust port to release the heat is arranged downstream of the housing forming the heat exchanger unit 33.

The fan 34 of the blower 32 is desirably configured of a sirocco fan with the axis thereof at right angles to the air inlet 35. In both cooling and heating modes, the air-conditioning air that has flowed through the rear foot duct 38 is sucked into the air inlet 35 and blown out in centrifugal direction from the rotation center of the fan 34. This air-conditioning air is passed through the connection tube 37 and the air outlet path 20 and, from around the hips and the thighs of the occupant, blown into the compartments out of the surface of the seat portion 1*b*, 2*b*. In this way, the air-conditioning air passing through the rear foot duct 38 is sent to the occupants positively. Thus, the air felt cool by the occupants is blown out in cooling mode, while the air felt warm by the occupants is blown out in heating mode.

In the case where the height of the fan 34 of the blower 32 is reduced, the system height can be also reduced, and the space formed between the seat portion 1*b*, 2*b* and the rear foot duct 38 can be effectively utilized. Also, by increasing the fan diameter of the blower 32, the air capacity can be secured while at the same time increasing the resistance to the high pressure loss as a feature unique to the sirocco fan. Even in the case where the air outlet path 20 is small in sectional area or complicated in shape, therefore, a predetermined air capacity can be secured.

Figure 3:
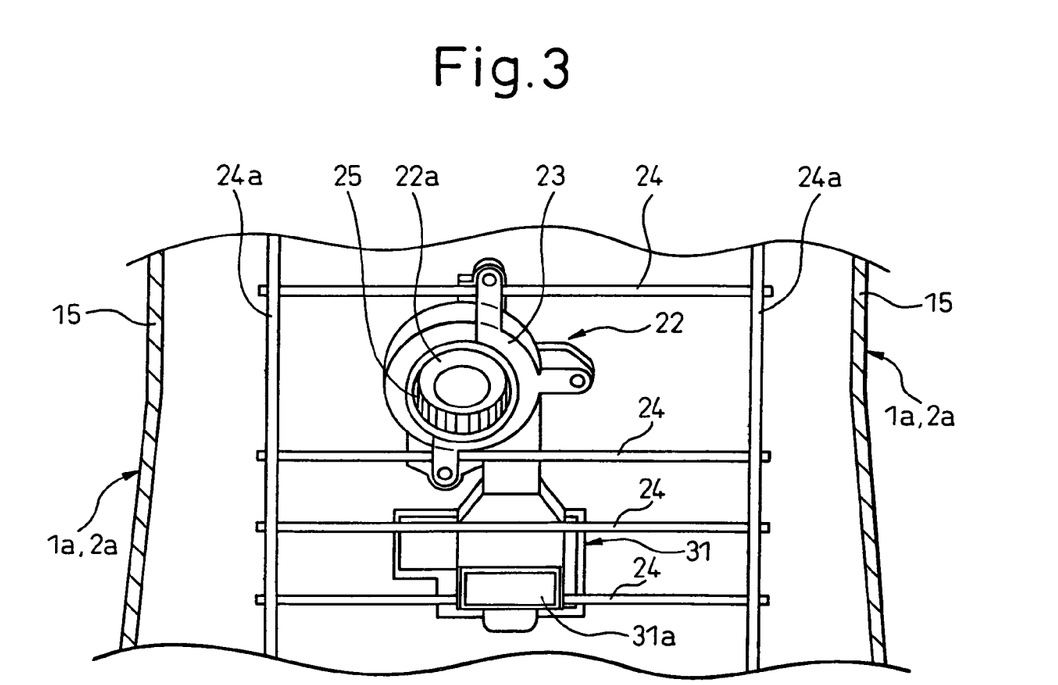
FIG. 3 is a front view of the interior of the seatback and shows a configuration of the automotive seat air-conditioning system according to the first embodiment of the invention.

Now, a configuration in which the blower 22 is mounted on the seatback 1*a*, 2*a* is explained in detail with reference to FIGS. 3, 4. FIG. 3 is a front view of the interior of the seatback and shows the layout of the blower in the automotive seat air-conditioning system. As shown in FIG. 3, a plurality of horizontally extending seat spring members 24 and seat spring support members 24*a* for holding the ends of the seat spring members 24 are arranged on the back of the main pad 16 in the seatback 1*a*, 2*a*. The frame member described above, though not shown in FIG. 3, is arranged inside the cover pad 16.

The blower 22 and the heat exchanger unit 31 are arranged on the back of the seatback 1*a*, 2*a* rearward of the seat spring members 24, and fixed on by holding the seat spring members 24 with the bracket 23. The bracket 23 is fixedly screwed on the blower 22.

The blower 22 and the heat exchanger unit 31 are arranged longitudinally in such a manner that the air inlet 22*a* of the blower 22 is located above while the air outlet 31*a* of the heat exchanger unit 31 is located lower than the air inlet 22*a* and thus the air-conditioning air 8, 9 flows downward.

Figure 4:
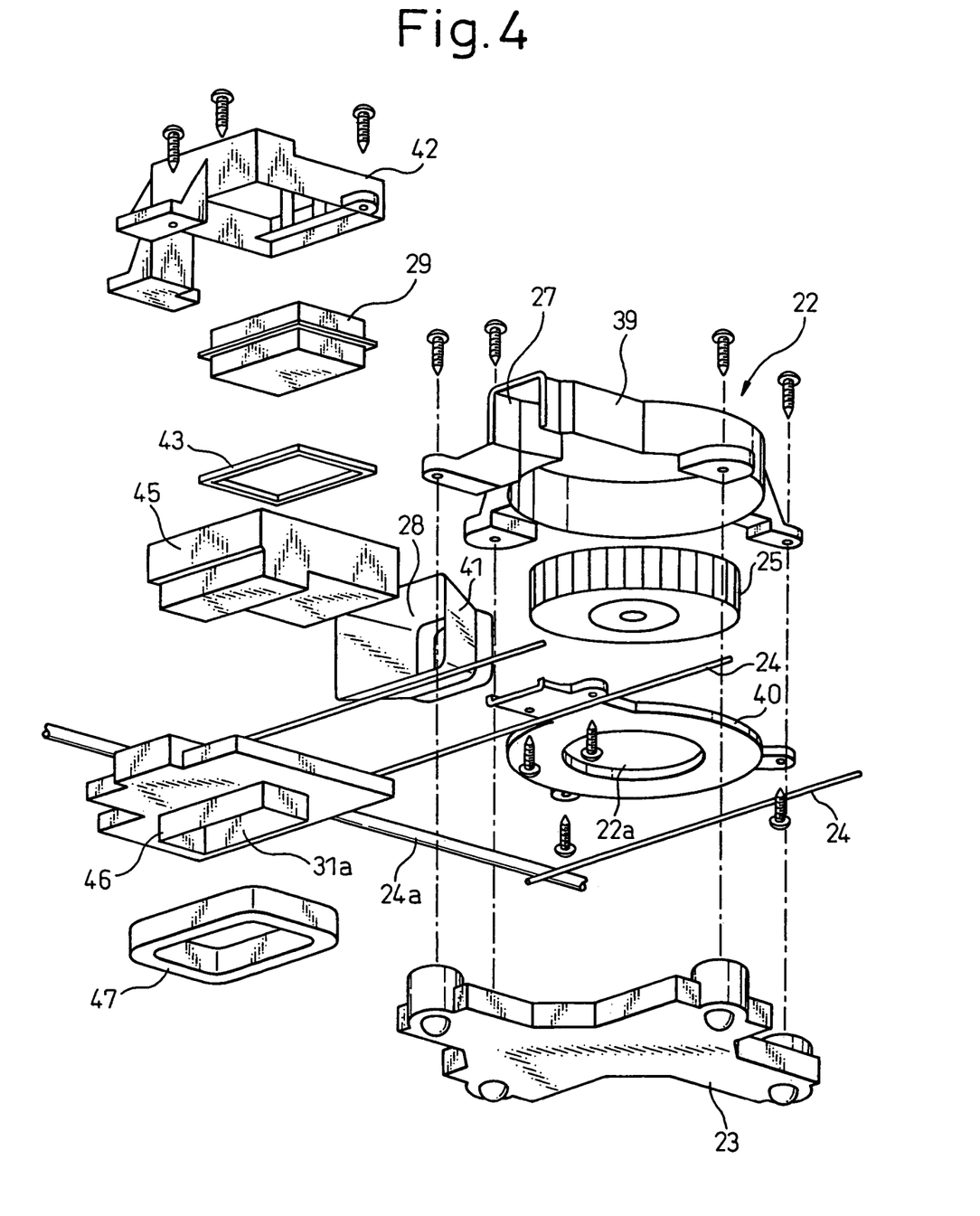
FIG. 4 is an exploded perspective view showing a mounting structure of the blower of the automotive seat air-conditioning system according to the first embodiment of the invention.

FIG. 4 is an exploded perspective view showing a configuration in which the blower is mounted in the automotive seat air-conditioning system. As shown in FIG. 4, the blower 22 is configured mainly of a fan 25, a casing member 39 for covering the outer peripheral portion and the downstream side of the fan 25 and a bellmouthed member 40 having an air inlet 22*a* and covering the upstream side of the fan 25. The bellmouthed member 40, with the fan 25 accommodated in the casing member 39, is fixedly screwed to the casing member 39.

The heat exchanger unit 31 is mainly configured of a first case member 42, a second case member 45 and a third case member 46. The first case member 42 and the second case member 45 are coupled to each other longitudinally, i.e. vertically in FIG. 4, with the Peltier module 29 accommodated therein. In the process, a packing 43 is interposed between the Peltier module 29 and the second case member 45 to prevent the air leakage. Further, the first case member 42 and the third case member 46 are coupled by being screwed to each other longitudinally, i.e. vertically in FIG. 4, with the second case member 45 interposed therebetween. The air inlet 28 of the heat exchanger unit 31 thus configured is connected to the air outlet 27 of the blower 22 through the connection duct 41.

The blower 22 and the heat exchanger unit 31 thus integrated are arranged rearward of the seat spring members 24, i.e. backward of the seatback 1a, 2a and fixedly screwed to the bracket 23 arranged forward of the seat spring members 24. Also, the air outlet 31a formed on the third case member 46 is coupled to the connection tube 30 through a packing 47 for air leakage prevention. In this way, the blower 22 is arranged rearward of the seat spring members 24, and therefore the occupants hardly feels the vibration or incongruity due to the accommodation of the blower 22, and the seating comfort of the occupants is not adversely affected.

Next, the configuration of the Peltier module 29 is explained with reference to FIG. 5. FIG. 5 is a schematic sectional view showing the configuration of the Peltier module included in the automotive seat air-conditioning system. The Peltier module 29 is configured mainly of a fin submodule 29a for passing the cool air, a fin module 29b for passing the warm air and an element module 29c, wherein the element module 29c is interposed between the fin submodule 29a and the fin module 29b.

The fin submodule 29a and the fin module 29b are both configured of radiation fins of copper. The element module 29c is configured of a glass epoxy resin substrate 48 containing a thermoelectric element 50 of bismuth tellurium and a waterproof polyimide film 48 covered on the glass epoxy resin substrate 48. The thermoelectric element 50 is 1 mm in height, and the glass epoxy resin substrate 48 is 0.95 mm in thickness. The thermoelectric element 50 is electrically connected with the fin submodule 29a and the fin module 29b through an electrode 50 plated with copper or nickel. The frame member 51 functions to stabilize the shape of the fin submodule 29a and the fin module 29b, and a packing 49 is interposed between the frame member 51 and the glass epoxy resin substrate 48.

The Peltier module 29 having this configuration is driven by being switched to the cooling air supply side or the heating air supply side in an operatively interlocked relation with the switching between the cooling mode and the heating mode of the automotive climate control system. Specifically, the Peltier module 29 is arranged in the heat exchange units 31, 33 so as to supply the cool air or the warm air selectively to the outlet air paths 18, 20 in accordance with the cooling mode or the heating mode of the automotive climate control system.

With this configuration, an explanation is made about the flow of the air-conditioning air 8, 9 blown out from the air-conditioning air outlets 3, 4, 5 and circulated around the occupants upon activation of the automotive seat air-conditioning system. Once the automotive climate control system starts the operation in cooling mode, for example, the air-conditioning air 8, 9 from the air-conditioning air outlets 3, 4, 5 is blown out toward the occupants. With the blowout of the air-conditioning air 8, 9 in this way, the blower 22 of the automotive seat air-conditioning system is started. At the same time, the blower 36 may be also started as required.

In the case where the automotive climate control system operates in cooling mode as in summer, the air-conditioning air is blown in face mode, and therefore the air is blown out toward the face and the upper half body of the occupant. The air-conditioning air 8, 9 hitting the face and the upper half body of the occupant is suppressed from flowing rearward or sideways and, after flowing around the body of the occupant, is introduced into the seat from the air inlets 6, 7. This air, passing through the air inlet path 17 and the blower 22, is blown out to the outlet air path 18, and further passes through the outlet air path 18 and moving around the body of the occupant, blown out into the compartments as a circulation air 10, 11 from the seat surface.

By repeating this flow, the circulation of the air-conditioning air is formed around the occupant. Thus, the air-conditioning operation high in energy efficiency can be provided with comparatively simple equipment. Especially, in the case where the air-conditioning air is blown out from around the portion of the seat surface closely attached to the body of the occupant, an air flow positively obviating the humidity and heat, which otherwise might be felt by the occupant, is formed usefully.

In the case where the automotive climate control system is in heating mode, on the other hand, the air-conditioning air is in foot mode, and therefore blown out toward the feet of the occupant. The air-conditioning air hit upon the feet of the occupant is suppressed from flowing rearward or sideways and, flowing upward around the body of the occupant, introduced into the seat from the air inlets 6, 7. This air, passing through the inlet air path 17 and the blower 22, is blown out into the air outlet path 18. Then, through the air outlet path 18, the air is blown out as a circulation air 10, 11 from the seat surface into the compartments around and along the body of the occupant.

This flow is repeated, and an air-conditioning air flow for heating is formed around the occupant. Thus, the cold feeling of the upper half body of the occupant is alleviated. As a result, the heating operation with the target blowout air temperature set to a comparatively low level is made possible, and an air-conditioning operation high in energy efficiency can be performed with a comparatively simple equipment.

The control operation of the automotive seat air-conditioning system operatively interlocked with the target blowout air temperature TAO of the automotive climate control system is explained below. As shown in FIG. 6, this control operation is performed to drive the Peltier module 29 in cooling air supply mode while the automotive climate control system is in cooling mode. With the decrease in the target blowout air temperature TAO of the automotive climate control system, the output of the Peltier module 29 is increased and so is the air amount blown by the blower 22.

In heating mode, on the other hand, the Peltier module 19 is switched to heating air supply mode. At the same time, the air capacity is controlled taking the stove ratio into consideration.

As described above, the automotive seat air-conditioning system according to this embodiment comprises vehicle seats 1, 2 including seat portions 1b, 2b in which occupants are seated and seatbacks 1a, 2a against which the occupants rest their backs and a blower 22 for sucking in the air-conditioning air 8, 9 flowing in the compartments, wherein the air-conditioning air 8, 9 is sucked in by the blower 22 from the air inlets 6, 7 formed on the surface of the seatbacks 1a, 2a, while at the same time blowing out the sucked air-conditioning air from the surface portions of the vehicle seats 1, 2 other than the air inlets. 6, 7.

With this configuration, the highly comfortable air-controlled air-conditioning air flow is formed toward the seatbacks, thereby forming a highly comfortable air-conditioning space around the occupant. Further, the air-conditioning air sucked in from the surface portion of the vehicle seats other than the air inlets is blown out thereby to form the personal air-controlled space where the air-conditioning air is circulated around the occupant.

Also, the automotive seat air-conditioning system includes the air inlets 6, 7 in the upper part of the seatbacks 1a, 2a. With this configuration, the provision of the air inlets in the upper part of the seatbacks where pressure is hardly exerted from the body of the occupant reduces the air path resistance and makes it possible to suck in the air-conditioning air more positively.

Also, in this automotive seat air-conditioning system, the air-conditioning air 8, 9 sucked in from the air inlets 6, 7 is blown out from the surface of the vehicle seats located lower than the air inlets 6, 7. With this configuration, the air flow circulating widely in vertical direction can be formed around the occupant through the vehicle seats, and therefore the air-conditioning environment around the occupant is improved.

Also, the automotive seat air-conditioning system according to the invention has such a configuration that the air-conditioning air 8, 9 sucked in from the air inlets 6 7 is blown out from the surface portion of the vehicle seats 1, 2 other than the air inlets 6, 7 through the heat exchanger 29. With this configuration, the air-conditioning air is further controlled in temperature by the heat exchanger and then blown out from the surface of the vehicle seats. Thus, the comfort of the occupants is further enhanced.

Further, the automotive seat air-conditioning system employs the Peltier module 29 as a heat exchanger. With this configuration, the heat exchanger can be reduced in size, and therefore the space on the back of the vehicle seats can be effectively utilized. Also, the cooling operation can be performed only by supplying electric power, while at the same time reducing the blowing noise and heat resistance.

Also, the automotive seat air-conditioning system according to the invention is controlled in such a manner that the Peltier module 29 is driven in cooling air supply mode as long as the automotive climate control system is in cooling mode. Thus, with the decrease in the target blowout temperature TAO of the automotive climate control system, the output of the Peltier module 29 is increased and so is the air amount blown by the blower 22. With this control operation, the cooling capacity required by the automotive climate control system can be complemented by the output of the Peltier module. Thus, the feeling on the part of the occupants against the cooling air in cooling mode is further improved and the demand for cooling from the occupants can be efficiently met.

While the invention has been described by reference to specific embodiments chosen for purposes of illustration, it should be apparent that numerous modifications could be made thereto, by those skilled in the art, without departing from the basic concept and scope of the invention.

The invention claimed is:

1. An automotive seat air-conditioning system comprising:
a vehicle seat including a seat portion used by an occupant and a seatback against which the occupant rests his/her back, the vehicle seat being disposed in a passenger compartment; and
first blowing means for sucking in air-conditioning air flowing in the passenger compartment, the blowing means being disposed within the vehicle seat; wherein
the air-conditioning air is sucked in by the first blowing means from an air inlet formed on a surface of the vehicle seat, and the air-conditioning air thus sucked in is blown out from a first surface portion of the vehicle seat other than the air inlet;

the air-conditioning air sucked in from the air inlet is blown out from the first surface portion of the vehicle seat other than the air inlet through a heat exchanger configured of a Peltier module;
as long as an automotive climate control system is in a cooling mode, the Peltier module is controlled to operate in a cooling air mode, and
with a decrease in a target blowout temperature TAO of the automotive climate control system, output of the Peltier module is increased and so is a blow amount of the first blowing means.

2. An automotive seat air-conditioning system according to claim 1,
wherein the air inlet is arranged in an upper part of the seatback.

3. An automotive seat air-conditioning system according to claim 1,
wherein the air-conditioning air sucked in from the air inlet is blown out from a vehicle seat surface located lower than the air inlet.

4. An automotive seat air-conditioning system according to claim 1, further comprising second blower means for sucking in air-conditioned air and blowing the air-conditioned air out from a second surface portion of the vehicle seat, the second blower means being disposed within the seat portion, the first blowing means being disposed within the seatback.

5. The automotive seat air-conditioning system according to claim 1, wherein the first blowing means is disposed within the seatback of the vehicle seat and the surface of the vehicle seat is a surface of the seatback.

6. The automotive seat air-conditioning system according to claim 5, wherein the first blowing means is disposed within the seat portion of the vehicle seat.

7. The automotive seat air-conditioning system according to claim 1, wherein the first blowing means is disposed within the seat portion of the vehicle seat.

8. An automotive seat air-conditioning system comprising:
a vehicle seat including a seat portion used by an occupant and a seatback against which the occupant rests his/her back, the vehicle seat being disposed in a passenger compartment;
first blowing means for sucking in air-conditioning air flowing in the passenger compartment; wherein
the air-conditioning air is sucked in by the first blowing means from an air inlet formed on a surface of the vehicle seat which is in contact with the occupant;
the air-conditioning air thus sucked in is blown out from a first surface portion of the vehicle seat other than the air inlet; and
the air inlet is formed on a surface of the vehicle seat which is in direct contact with the occupant.

9. An automotive seat air-conditioning system comprising:
a vehicle seat including a seat portion used by an occupant and a seatback against which the occupant rests his/her back, the vehicle seat being disposed in a passenger compartment;
first blowing means for sucking in air-conditioning air flowing in the passenger compartment; wherein
the air-conditioning air is sucked in by the first blowing means from an air inlet formed on a surface of the vehicle seat which is in contact with the occupant;
the air-conditioning air thus sucked in is blown out from a first surface portion of the vehicle seat other than the air inlet; and
the air inlet faces an instrument panel in the passenger compartment.

10. An automotive seat air-conditioning system comprising:
- a vehicle seat including a seat portion used by an occupant and a seatback against which the occupant rests his/her back, the vehicle seat being disposed in a passenger compartment;
- first blowing means for sucking in air-conditioning air flowing in the passenger compartment; wherein
- the air-conditioning air is sucked in by the first blowing means from an air inlet formed on a surface of the vehicle seat which is in contact with the occupant;
- the air-conditioning air thus sucked in is blown out from a first surface portion of the vehicle seat other than the air inlet; and
- the air inlet is formed on a front upper surface of the vehicle seat.

11. An automotive seat air-conditioning system comprising:
- a vehicle seat including a seat portion used by an occupant and a seatback against which the occupant rests his/her back, the vehicle seat being disposed in a passenger compartment;
- first blowing means for sucking in air-conditioning air flowing in the passenger compartment; wherein
- the air-conditioning air is sucked in by the first blowing means from an air inlet formed on a surface of the vehicle seat which is in contact with the occupant;
- the air-conditioning air thus sucked in is blown out from a first surface portion of the vehicle seat other than the air inlet; and
- the air inlet faces the occupant of the vehicle seat.

* * * * *

UNITED STATES PATENT AND TRADEMARK OFFICE
CERTIFICATE OF CORRECTION

PATENT NO. : 7,647,780 B2  Page 1 of 1
APPLICATION NO. : 11/589395
DATED : January 19, 2010
INVENTOR(S) : Aoki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 142 days.

Signed and Sealed this

Sixteenth Day of November, 2010

David J. Kappos
*Director of the United States Patent and Trademark Office*